United States Patent
Lin et al.

(10) Patent No.: US 6,827,589 B2
(45) Date of Patent: Dec. 7, 2004

(54) MOTHERBOARD WITH A 4-PIN ATX POWER MALE CONNECTOR

(75) Inventors: Wei-Kang Lin, Daan Chiu Taipei (TW); Chien-Hsing Ho, Peitou Chiu Taipei (TW)

(73) Assignee: Asustek Computer Inc., Taipei (TW)

(*) Notice: Subject to any disclaimer, the term of this patent is extended or adjusted under 35 U.S.C. 154(b) by 218 days.

(21) Appl. No.: 10/096,940

(22) Filed: Mar. 14, 2002

(65) Prior Publication Data

US 2003/0032311 A1 Feb. 13, 2003

(30) Foreign Application Priority Data

Aug. 9, 2001 (TW) ................................ 90213598 U

(51) Int. Cl.[7] .............................................. H05K 1/14
(52) U.S. Cl. ................................................ 439/76.1
(58) Field of Search ...................... 439/76.1; 361/788, 361/684, 686

(56) References Cited

U.S. PATENT DOCUMENTS 6,301,104 B1 * 10/2001 Hu .............................. 361/684

OTHER PUBLICATIONS http://www.intel.com/support/motherboards/index.htm.*

* cited by examiner

Primary Examiner—Renee Luebke
(74) Attorney, Agent, or Firm—Rabin & Berdo, P.C.

(57) ABSTRACT

A motherboard with multiple power selectivity. The components formed on the motherboard comprise a 20-pin ATX power male connector and a 4-pin ATX power male connector. The 20-pin ATX power male connector is coupled electrically with devices and a CPU socket on the motherboard through circuits thereon. The 4-pin ATX power male connector, with four pins configured in line, is applied to provide individual +12 volts/ground/ground/+5 volts power. The 4-pin ATX power male connector is coupled electrically with the CPU socket.

13 Claims, 2 Drawing Sheets

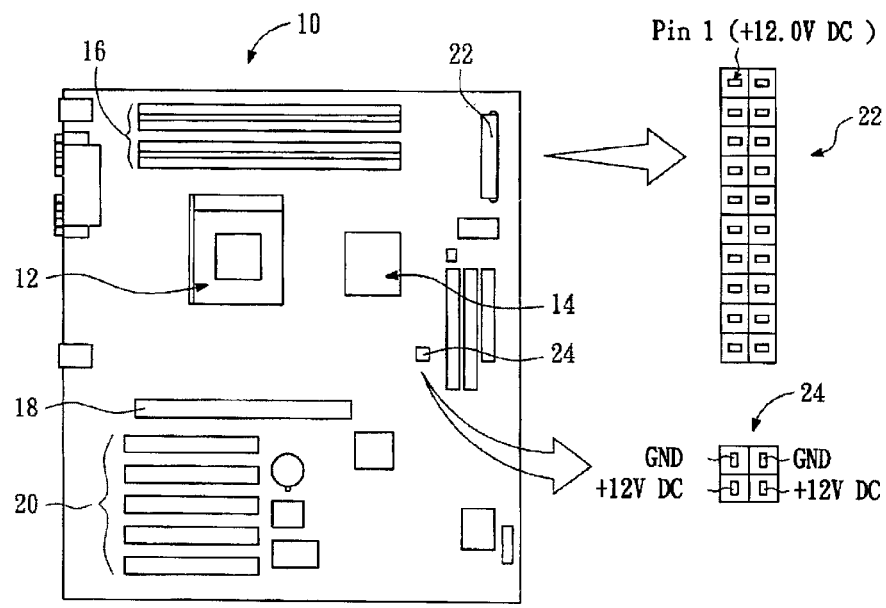
Fig. 1A
(Prior Art)
Fig. 1B
(Prior Art)
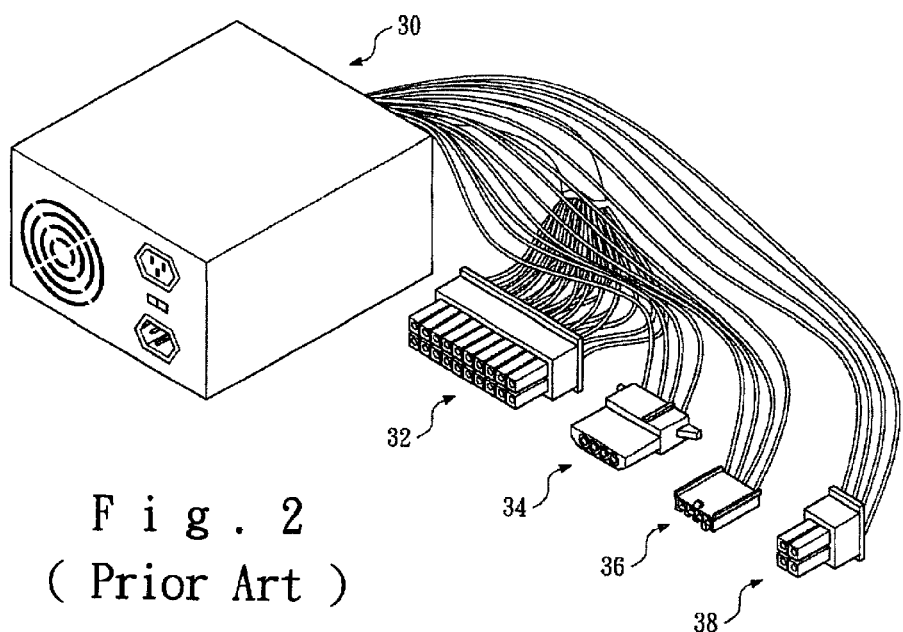
Fig. 2
(Prior Art)

MOTHERBOARD WITH A 4-PIN ATX POWER MALE CONNECTOR

FIELD OF THE INVENTION

The present invention relates to a motherboard of a desktop, and more specifically, to a motherboard with a 4-pin ATX power male connector.

BACKGROUND OF THE INVENTION

With the advance of electronic science and technology, the multimedia computers have high audio and video quality. And the increasing use of personal computers also has driven the development of computer industry to become more vigorous. For instance, PENTIUM 4, the fourth generation CPU manufactured by Intel, has a more fine and complicated internal frame fabricated with the process of 0.13 micrometer to provide powerful computing functions. However, with the structures of the CPU becoming more enormous and complicated, and the power consumption thereof has increased substantially. And it is a challenge to apply the prior power supply configured to provide sufficient power for driving the PENTIUM 4®.

Please refer to FIG. 1A, where the motherboard applied to support the PENTIUM 4 CPU is illustrated. The components configured on the motherboard comprise a socket 12 to mount the PENTIUM 4® CPU from Intel Corp. and a chipset 14 constituted with a memory controller hub (MCH). Besides, four sets of RIMM sockets 16 located on the motherboard are applied to mount memory devices, and an accelerated graphics port (AGP) 18 is designed to mount a graphic card. And five sets of PCI ports 20 are applied to install expansion cards.

It is noted that according to the motherboard specification prior to the PENTIUM 4 CPU, only the ATX power supply male connector 22 with twenty pins is configured on the motherboard 10 to provide the power for driving various components thereon as shown in FIG. 1B. And only one pin (Pin 1) of the ATX power male connector 22 is applied to provide 12 volts of DC voltage for the CPU operation, as shown in FIG. 1B. The other pins thereof are applied to provide +5 or +3.3 volts DC power or ground for driving the chips and devices on the motherboard 10.

However, abundant power is required to provide the CPU operating in a stable state because the PENTIUM 4 CPU has an normous core frame and higher execution rate. For the purpose of preventing the computers from crashing frequently due to lack of power supply, a square male connector 24 is provided by Intel in the specification of motherboard for providing the PENTIUM 4 CPU an extra +12 volts power supply. As illustrated in FIG. 1B, the square connector 24 has four pins arranged in a square. Two pins (+12V DC) of the square connector 24 are applied to provide +12 volts of DC power and the other two pins (GND) are applied to connect to ground.

Because of applying the above four pins to provide an extra +12 volts for the PENTIUM 4 CPU, it is required to add a new connector of power supply suitable to the specification of the PENTIUM 4. Please refer to FIG. 2, in which the power supply 30 supporting the motherboard of the PENTIUM 4 is illustrated. The power supply 30 has four types of power lines. An ATX female connector 32 with twenty pins can connect with the 20-pins (20-pins) ATX male connector 22 to provide power for the CPU and the chips on the motherboard 10. And a large 4-pins female connector 34, called a 5.25 inches (5.25 inch) drive connector (P7), is applied to connect and drive peripheral devices such as hard disks and CD-ROM drives. As to a small 4-pins female connector 36, called a 3.5 inch drive connector (P9), is applied to connect and drive the soft diskettes. Besides, a square female connector 38 with four pins is applied to connect with the square male connector 24 on the motherboard 10 to provide power for CPU operation.

However, for the present desktops, the ATX power supply only includes the above 20-pins ATX female connector, the 5.25 inches drive female connector and the 3.5 inches drive female connector. Namely, there is no extra square female connector suitable to the motherboard of the PENTIUM 4. Thus, when consumers want to upgrade their present desktops with a PENTIUM 4 motherboard and CPU, they have to pay much money to buy the new ATX power supply 30 with the extra square female connector 24 for supporting the specification of the PENTIUM 4.

Therefore, how to provide sufficient power for the operation of the PENTIUM 4 CPU based on the present ATX power supplies and housings is an important issue. And for the consumer, they can still use their prior ATX power supply to provide an extra +12 volts of DC power for supporting the PENTIUM 4 motherboard and ensuring the reliability and stability of operations thereof.

SUMMARY OF THE INVENTION

One purpose of the present invention is to provide a motherboard that can support processors such as the PENTIUM 4 and above for satisfying the prior ATX power supply.

Another purpose of the present invention is to provide a motherboard with multiple power supply connectors, whereby the prior ATX power supply can be applied to provide the PENTIUM 4 CPU enough power.

The present invention provides a motherboard with a multiple power supply. The components formed on the motherboard comprise a 20-pins ATX power male connector and a 4-pins ATX power male connector. The 20-pins ATX power male connector is coupled electrically with devices and a CPU socket on the motherboard through circuits thereon. And the 4-pins ATX power male connector with four pins configured in line is applied to provide individually +12 volts/ground/ground/+5 volts power. The 4-pins ATX power male connector is coupled electrically with the CPU socket.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings:

FIGS. 1A~B are motherboard layouts illustrating the components and power connectors thereon for supporting the PENTIUM 4 CPU fabricated by Intel;

FIG. 2 illustrates a power supply with an extra square power connector for supporting the motherboard of a PENTIUM 4;

DETAILED DESCRIPTION OF THE PREFERRED EMBODIMENT

The present invention discloses a motherboard satisfying the PENTIUM 4 CPU with multiple selectivity of power supply. A 5.25 inch drive connector or a 3.5 nch drive connector for the prior ATX power supply is defined on the motherboard to connect electrically with the CPU socket through the circuit patterns thereon. Therefore, consumers can use their present ATX power supply to provide the PENTIUM 4 CPU an extra +12 volts of DC power for preventing a computer crash due to lacking power. The detailed embodiments of the present invention are described as follows.

Figure 3:
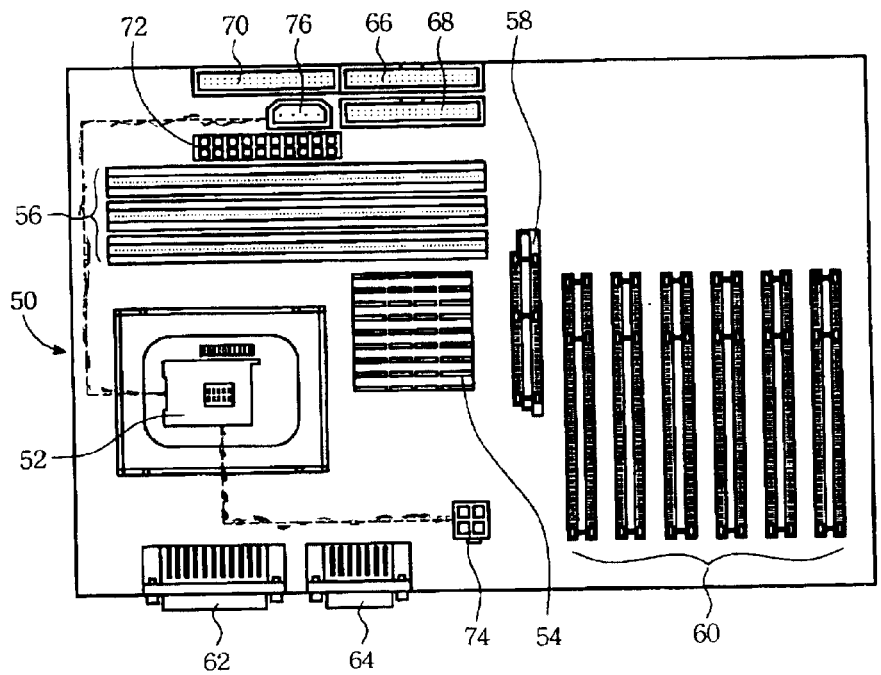
FIG. 3 is a motherboard layout illustrating the motherboard with 4-pins male connector satisfying the prior ATX power supply according to the present invention.

Referring to FIG. 3, a motherboard which allows a consumer to choose among connectors for providing extra power. It is noted that the connections, specifications and functions of various devices are described in detail in the embodiment below so that the features and essentials of the components become distinct and easy to be understood. However the description of the embodiment should not to be applied to limit the present invention. And it just illustrates one best embodiment according to the present invention.

As shown in FIG. 3, a motherboard 50 is provided to support the PENTIUM 4 CPU and above processors fabricated by Intel. The components configured on the motherboard comprise a CPU socket 52 for the PENTIUM 4 CPU and a chipset 54 constituted with memory controller hub (MCH) devices. In a preferred embodiment, when the CPU socket 52 is Socket 423, the chipset 54 can be made of the Intel 850 chipset. And when the CPU socket 52 is Socket 478, the chipset 54 can be made of the Intel 845 chipset.

Besides, three pieces of DIMM sockets 56 located on the motherboard 50 are designed to mount memory devices. Each DIMM socket 56 has 168 pins and can be applied to mount the SDRAM devices. And an accelerated graphics port (AGP) 58 applied for mounting a graphic card is located on the motherboard 50. Further, six PCI ports 60 are applied to install expansion cards. Similarly a parallel port 62, a game connect port 64, a serial port, a PS/2 connect port, an USB connect port, etc. are defined on the edge of the motherboard 50. And two IDE slots 66 and 68 are defined adjacent to the DIMM socket 56 to connect the hard disk, CD-ROM device, and other peripheral devices through bus lines. Besides, a FDD slot 70 is defined adjacent to the IDE slots 66, 68 to connect to the soft disk through bus lines.

In addition, a 20-pins ATX power male connector 72 is defined on the motherboard 50 to provide the power for driving various components and the CPU device thereon. Notably, the ATX power male connector 72 is connected with the CPU, chipsets, and devices on the motherboard 50 through the circuit patterns thereon. And a first pin (Pin 1) of the ATX power male connector 72 is applied to output +12 volts of DC power to operate the PENTIUM 4 CPU. Other pins are applied to provide +5 and +3.3 volts (or +3 volts) power or to be grounded for the purpose of operating other chips and devices.

Besides, a square male connector 74 with four pins is defined on the motherboard 50 to provide the PENTIUM 4 CPU sufficient power according to Intel specifications. The square male connector 74 has four pins arranged squarely to input +12 volts DC power and to provide a ground. Thus, the computer can be operated in a stable state to prevent the computer from crashing.

However the square male connector 74 should be connected with the square female connector 38 with four pins of a new power supply (as shown in FIG. 2) to provide sufficient power to drive the PENTIUM 4 CPU. Therefore in the present invention, an ATX power male connector 76 with four pins is defined on the motherboard 50.

As illustrated in FIG. 3, the 4-pins ATX power male connector 76 is located adjacent to the above 20-pins ATX power male connector 72, and specially the four pins thereof are arranged in a line to individually provide +12 volts/ground/ground/+5 volts power. And the 4-pins ATX power male connector 76 is connected electrically to the CPU socket through the circuits patterned on the motherboard 50 for providing extra power to drive the PENTIUM 4 CPU.

Figure 4:
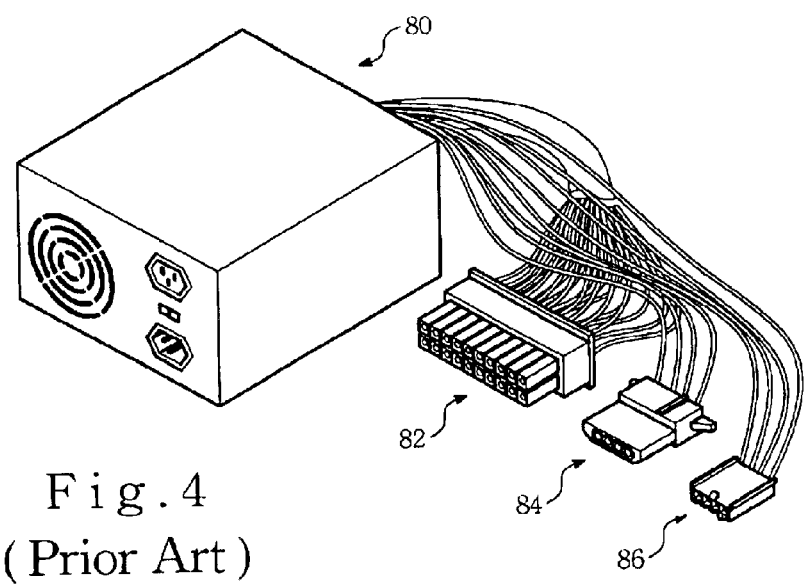
FIG. 4 illustrates the prior ATX power supply and the power connectors thereof.

Referring to FIG. 4, for example, the power connectors of the prior ATX power supply 80 includes 20-pins ATX power female connectors 82, large 4-pins female connectors 84 which is called 5.25 inch drive connectors, and small 4-pins female connectors 86 called inch drive connectors. The 20-pins ATX power female connector 82 is applied to connect with the 20-pins ATX power male connector 72 on motherboard 50 to provide sufficient power for devices thereon. And the 5.25 and 3.5 inch drive connectors 84 and 86 are applied to connect with peripherals of desktops to drive those devices. In general, the large 4-pins female connectors 84 are applied to connect with the devices such as hard disks, CD-ROMs, recorders, etc. And the small 4-pins female connectors 86 are applied to connect with the soft disks to drive it.

Therefore, when the 4-pins ATX power male connector 76 is made of 5.25 inch or 3.5 inch drive connectors, the same 5.25 inch or 3.5 inch drive connectors 84, 86 of the prior ATX power supply 80 can be plugged into the connector 76 to provide an electrical connection. And because two types of 4-pins female connectors 84, 86 are both applied to provide +12 volts/ground/ground/+5 volts of power, the first pin of the female connector 84 or 86 can be applied to provide the PENTIUM 4 CPU an extra +12 volts of power.

Thus, by fabricating the 4-pins 5.25 or 3.5 inch drive male connectors on the motherboard 50, the consumers can use the 4-pins 5.25 inch or 3.5 inch drive connectors 84, 86 of the prior ATX power supply they have, to provide the PENTIUM 4 CPU an extra +12 volts power. And there is no requirement to buy the new type power supply to satisfy PENTIUM 4 specifications.

As is understood by a person skilled in the art, the foregoing preferred embodiment of the present invention is illustrated of the present invention rather than limiting of the present invention. For instance the motherboard satisfying specifications of the PENTIUM 4 is illustrated in the above embodiment, but actually the feature of the present invention is to fabricate 5.25 inches or 3.5 inches drive connectors of prior ATX power supplies on the motherboard for providing the new generation CPU (PENTIUM 4 and above) sufficient power, and for prolonging the usable life of the prior ATX power supply. It is intended to cover various modifications and similar arrangements included within the spirit and scope of the appended claims, the scope of which should be accorded the broadest interpretation so as to encompass all such modifications and similar structure.

While the preferred embodiment of the invention has been illustrated and described, it will be appreciated that various changes can be made therein without departing from the spirit and scope of the invention.

We claim:

1. A motherboard, wherein components formed on said motherboard comprise:
    20-pin ATX power male connector, coupling electrically with devices and a CPU socket on said motherboard through circuits thereon; and
    4-pin ATX power male connector with four pins configured in a line for providing from a power source +12 volts/ground/ground/+5 volts power, coupling electrically with said CPU socket through said circuits.

2. The motherboard of claim 1, further comprising a 4-pin square male connector formed on said motherboard with four pins configured squarely to provide individually from a source of +12 volts/ground/ground/+12 volts power.

3. The motherboard of claim 1, wherein a first pin of said 4-pin ATX power male connector is applied to input +12 volts DC power for operating a CPU device.

4. The motherboard of claim 3, wherein said 4-pin ATX power male connector is adapted to plug into a 5.25 inch-drive female connector of an ATX power supply for inputting an extra +12 volts of power for operating said CPU device.

5. The motherboard of claim 3, wherein said 4-pin ATX power male connector is adapted to plug into a 3.5 inch drive female connector of an ATX power supply for inputting an extra +12 volts of power for operating said CPU device.

6. The motherboard of claim 1, wherein said 4-pin ATX power male connector is a 5.25 inch drive connector.

7. The motherboard of claim 1, wherein said 4-pin ATX power male connector is a 3.5 inch drive connector.

8. A motherboard comprising PENTIUM 4 and above CPU devices and processors having a 20-pin ATX power male connector and a 4-pin ATX power male connector thereon, wherein a first pin of said 20-pin ATX power male connector is adapted for being applied to input 12 volts DC power from a power source for operating a CPU device, and said 4-pin ATX power male connector has four pins configured in a line to output +12 volts/ground/ground/+5 volts power for providing extra power from the a power source to said CPU device.

9. The motherboard of claim 8, wherein said 4-pin ATX power male connector is adapted for having a 5.25 inch drive female connector of an ATX power supply plugged thereon to for inputting an extra +12 volts of power for operating said CPU device.

10. The motherboard of claim 8, wherein said 4-pin ATX power male connector is adapted to have a 3.5 inch drive female connector of an ATX power supply plugged thereonto for inputting an extra +12 volts of power for operating said CPU device.

11. The motherboard of claim 8, wherein said 4-pin ATX power male connector is a 5.25 inch drive connector.

12. The motherboard of claim 8, wherein said 4-pin ATX power male connector is a 3.5 inch drive connector.

13. A motherboard supporting PENTIUM 4 and above CPU devices and processors having a 5.25 inch drive male connector formed thereon, wherein said 5.25 inch drive male connector has four pins configured in a line connecting with a CPU socket through circuits on said motherboard;

wherein said 5.25 inch drive male connector is adapted to connect with a 5.25 inch drive female connector of an ATX power supply to provide said CPU device 12 volts of power.

* * * * *